US008460138B2

(12) United States Patent
Unno (10) Patent No.: US 8,460,138 B2
(45) Date of Patent: Jun. 11, 2013

(54) V-BELT CONTINUOUSLY VARIABLE TRANSMISSION FOR SMALL VEHICLE, AND STRADDLE-TYPE VEHICLE

(75) Inventor: Toshio Unno, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 894 days.

(21) Appl. No.: 11/571,216

(22) PCT Filed: Jun. 28, 2005

(86) PCT No.: PCT/JP2005/011859
§ 371 (c)(1),
(2), (4) Date: Aug. 20, 2007

(87) PCT Pub. No.: WO2006/003904
PCT Pub. Date: Jan. 12, 2006

(65) Prior Publication Data
US 2008/0108463 A1    May 8, 2008

(30) Foreign Application Priority Data
Jul. 2, 2004    (JP) ................................. 2004-197243

(51) Int. Cl.
*F16H 9/18*    (2006.01)
(52) U.S. Cl.
USPC .......................................................... 474/29
(58) Field of Classification Search
USPC ....................................................... 474/8–46
IPC ....................................................... F16H 9/18
See application file for complete search history.

(56) References Cited

U.S. PATENT DOCUMENTS

| 2,295,161 | A | * | 9/1942 | Clay ................................. 474/23 |
| 2,486,524 | A | * | 11/1949 | Dulaney ........................... 74/339 |
| 4,541,821 | A | * | 9/1985 | Sakakibara ..................... 474/17 |
| 4,735,598 | A | * | 4/1988 | Moroto et al. ................... 474/29 |
| 4,946,424 | A | * | 8/1990 | Sakakibara et al. ............ 474/11 |
| 4,955,852 | A | * | 9/1990 | Morisawa ..................... 475/146 |
| 4,964,841 | A | * | 10/1990 | Takayama et al. ............. 474/11 |

(Continued)

FOREIGN PATENT DOCUMENTS

| DE | 19949273 A1 | 5/2000 |
| DE | 10317691 A1 | 11/2003 |

(Continued)

OTHER PUBLICATIONS

European Search Report for corresponding European application 05755711 lists the references above.

*Primary Examiner* — William A Rivera
*Assistant Examiner* — Henry Liu
(74) *Attorney, Agent, or Firm* — Keating & Bennett, LLP (57) ABSTRACT

To place an electric motor, which composes a groove width adjustment mechanism, away from a heat source so that the electric motor can be cooled actively, and to improve both the protection and the maintainability of the electric motor.
A primary sheave 113 and a secondary sheave 123 each forming a V-groove with a variable width for receiving a belt are provided. A case 105 for housing the primary sheave 113 and the secondary sheave 123 is formed with an opening 110 for sucking and exhausting air into and out of the case 105. An electric motor 140 for driving a groove width adjustment mechanism 141 for the V-groove of the primary sheave 113 is disposed in an airflow path outside the case 105.

11 Claims, 6 Drawing Sheets

U.S. PATENT DOCUMENTS

| | | | |
|---|---|---|---|
| 4,973,288 A * | 11/1990 | Sakakibara et al. | 474/8 |
| 5,005,442 A * | 4/1991 | Sakakibara et al. | 477/41 |
| 5,052,990 A * | 10/1991 | Sakakibara et al. | 475/210 |
| 5,057,061 A * | 10/1991 | Sakakibara et al. | 475/210 |
| 5,080,639 A * | 1/1992 | Sakakibara et al. | 475/211 |
| 5,094,652 A * | 3/1992 | Sakakibara et al. | 474/8 |
| 5,191,755 A * | 3/1993 | Gryspeerdt | 56/13.4 |
| 5,236,395 A * | 8/1993 | Lucich et al. | 474/69 |
| 5,282,773 A * | 2/1994 | Gryspeerdt | 474/24 |
| 5,334,103 A * | 8/1994 | Gryspeerdt | 474/18 |
| 5,361,744 A * | 11/1994 | Teraoka | 123/561 |
| 5,378,198 A * | 1/1995 | Moroto et al. | 474/8 |
| 5,421,440 A | 6/1995 | Kumagai | 192/90 |
| 5,591,100 A * | 1/1997 | Hayashi et al. | 477/44 |
| 5,690,427 A * | 11/1997 | Jennings | 366/100 |
| 6,050,911 A * | 4/2000 | Feuchter et al. | 474/12 |
| 6,120,400 A * | 9/2000 | Onogi | 474/46 |
| 6,267,700 B1 | 7/2001 | Takayama | |
| 6,383,102 B1 * | 5/2002 | Onogi | 474/46 |
| 6,398,680 B1 * | 6/2002 | Onogi | 474/46 |
| 6,468,170 B1 * | 10/2002 | Ito | 474/18 |
| 6,544,134 B2 * | 4/2003 | Ohyama et al. | 477/41 |
| 6,666,290 B2 * | 12/2003 | Yamauchi | 180/68.1 |
| 6,694,836 B2 * | 2/2004 | Kawamoto et al. | 74/371 |
| 6,733,406 B2 * | 5/2004 | Kitai et al. | 474/13 |
| 6,764,421 B2 * | 7/2004 | Onogi | 474/46 |
| 6,863,146 B2 * | 3/2005 | Kawamoto et al. | 180/346 |
| 6,902,502 B2 * | 6/2005 | Murakami et al. | 474/23 |
| 6,958,024 B2 * | 10/2005 | Takano | 474/14 |
| 6,962,543 B2 * | 11/2005 | Roby | 474/39 |
| 6,997,832 B2 * | 2/2006 | Onogi | 474/8 |
| 7,237,638 B2 * | 7/2007 | Ishikawa et al. | 180/219 |
| 7,556,576 B2 * | 7/2009 | Mochizuki et al. | 474/18 |
| 2002/0027032 A1 * | 3/2002 | Tsutsumikoshi | 180/219 |
| 2002/0119846 A1 * | 8/2002 | Kitai et al. | 474/14 |
| 2004/0102267 A1 * | 5/2004 | Murakami et al. | 474/69 |
| 2005/0037876 A1 * | 2/2005 | Unno et al. | 474/12 |

FOREIGN PATENT DOCUMENTS

| | | |
|---|---|---|
| JP | 59097355 A | 6/1984 |
| JP | 01-232121 | 9/1989 |
| JP | 05-030768 | 2/1993 |
| JP | 07-043015 | 2/1995 |
| JP | 2002-364710 | 12/2002 |
| JP | 2003-314671 | 11/2003 |
| JP | 2005-511987 | 4/2005 |
| WO | WO 03048612 A2 * | 6/2003 |

* cited by examiner

V-BELT CONTINUOUSLY VARIABLE TRANSMISSION FOR SMALL VEHICLE, AND STRADDLE-TYPE VEHICLE

CROSS-REFERENCE TO THE RELATED APPLICATION

This application is a national phase of the international application No. PCT/JP2005/011859 filed Jun. 28, 2005, the entire contents of which are incorporated by reference. This application also claims benefit of priority under 35 U.S.C. §119 to the Japanese Application No. 2004-197243 filed Jul. 2, 2004, the entire contents of which are incorporated by reference.

FIELD OF THE INVENTION

The present invention relates to a V-belt continuously variable transmission (CVT) for a small vehicle with a V-belt wound around a primary sheave and a secondary sheave, and a straddle-type vehicle having the V-belt CVT.

BACKGROUND ART

V-belt CVTs are widely used in small vehicles, such as straddle-type vehicles including motorcycles, four-wheeled buggies and snowmobiles. The V-belt CVT includes a primary shaft to which torque is input from a power source such as an engine or an electric motor, a secondary shaft from which the torque is output to a driving wheel, and a primary sheave and a secondary sheave with a variable groove width respectively disposed on the primary shaft and the secondary shaft. A V-belt is wound around the primary sheave and the secondary sheave. The speed change ratio between both the sheaves is adjusted continuously by changing the winding diameters of the V-belt around the respective sheaves, by varying the groove widths of the sheaves through a groove width adjustment mechanism.

In general, the primary sheave and the secondary sheave each includes a pair of a fixed flange and a movable flange disposed oppositely for movement toward and away from each other along the primary shaft or the secondary shaft. A groove in the shape of the letter "V" (which is hereinafter referred to as "V-groove") is formed between the fixed flange and the movable flange. The groove width adjustment mechanism moves the movable flange of the primary sheave and the secondary sheave to vary the width of the V-groove. This causes the winding diameter of the V-belt around the sheave to change, allowing continuous adjustment of the speed change ratio between both the sheaves. A centrifugal governor is commonly provided to the movable flange of the primary sheave as the groove width adjustment mechanism (see Patent Document 1, for example).

In recent years, small vehicles have been required to incorporate an automatic transmission that can achieve suitable speed change ratios according to the running condition and operating state of the vehicle in order to improve the running stability and promote energy conservation. However, the conventional groove width adjustment mechanism employing a centrifugal governor determines the speed change ratio between both the sheaves solely based on the rotational speed of the movable flange provided with the centrifugal governor. Thus, it has been difficult to control the speed change ratio flexibly, for example according to the operating state such as acceleration and deceleration.

In order to solve such a problem, there has been proposed a V-belt CVT provided with a groove width adjustment mechanism that employs an electric motor instead of a centrifugal governor to change the widths of the respective V-grooves of the primary sheave and the secondary sheave, so as to control the speed change ratio between both the sheaves to desired values (see Patent Document 2, for example).

Patent Document 1: JP-B-Sho 63-33588
Patent Document 2: JP-B-2967374

DISCLOSURE OF THE INVENTION

Problem to be Solved by the Invention

In the V-belt CVT disclosed in Patent Document 2, however, the electric motor, which composes the groove width adjustment mechanism, is disposed in a case for a power unit, which houses a part of the power source, in addition to the primary shaft and the secondary shaft, and the primary sheave and the secondary sheave. Thus, not only is the electric motor exposed to heat from the power source in the case, but also a high-temperature atmosphere is created around the electric motor because heat from the electric motor itself is not released to the outside.

As a result, it is necessary for the V-belt CVT disclosed in Patent Document 2 that the heat resistance of the electric motor composing the groove width adjustment mechanism should be increased, or that the electric motor should be surrounded by a cooling jacket, which unfavorably complicates the structure of the device and increases the cost. Another problem is that the electric motor disposed in the case for the power unit cannot be easily maintained or inspected.

The present invention has been made in view of the foregoing problem, and therefore has an object to provide a V-belt CVT for a small vehicle and a straddle-type vehicle that includes an electric motor, which composes a groove width adjustment mechanism, placed away from another heat source so that the electric motor can be cooled actively, and that can improve both the protection and the maintainability of the electric motor.

Means for Solving the Problem

In order to achieve the foregoing object, a first aspect of the present invention provides a V-belt CVT for a small vehicle, including: a primary sheave disposed on a primary shaft, to which torque is input from a power source, and forming a V-groove with a variable width for receiving a belt; a secondary sheave disposed on a secondary shaft, from which the torque is output to a driving wheel, and forming a V-groove with a variable width for receiving a belt; a V-belt received in the respective V-grooves of the primary sheave and the secondary sheave; an electric motor for driving a groove width adjustment mechanism for the V-groove of the primary sheave; and a case for housing the primary sheave and the secondary sheave, in which the case is formed with an opening for sucking and exhausting air into and out of the case, and the electric motor is disposed in a flow path of the air outside the case.

Also, in order to achieve the foregoing object, a second aspect of the present invention provides a V-belt CVT for a small vehicle, including: a primary sheave disposed on a primary shaft, to which torque is input from a power source, and forming a V-groove with a variable width for receiving a belt; a secondary sheave disposed on a secondary shaft, from which the torque is output to a driving wheel, and forming a V-groove with a variable width for receiving a belt; a V-belt received in the respective V-grooves of the primary sheave and the secondary sheave; an electric motor for driving a groove width adjustment mechanism for the V-groove of the primary sheave; and a case for housing the primary sheave and the secondary sheave, in which the primary sheave and the secondary sheave respectively have a pair of a movable flange and a fixed flange disposed oppositely for movement toward and away from each other and forming the V-groove, and in which the power source is disposed adjacent to one outer side of the case in the direction of the primary shaft, and the electric motor is disposed adjacent to the fixed flange of either the primary sheave or the secondary sheave, on the other outer side of the case in the direction of the primary shaft.

Preferably, as a third aspect of the present invention, in the V-belt CVT for a small vehicle according to the first aspect of the present invention described above, the primary sheave and the secondary sheave respectively have a pair of a movable flange and a fixed flange disposed oppositely for movement toward and away from each other and forming the V-groove, the power source is disposed adjacent to one outer side of the case in the direction of the primary shaft, and the electric motor is disposed adjacent to the fixed flange of either the primary sheave or the secondary sheave, on the other outer side of the case in the direction of the primary shaft.

Preferably, in the V-belt CVT for a small vehicle according to any one of the first to third aspects of the present invention described above, the primary sheave and the secondary sheave respectively have a pair of a movable flange and a fixed flange disposed oppositely for movement toward and away from each other and forming the V-groove, the power source is disposed adjacent to one outer side of the case in the direction of the primary shaft, and the electric motor is disposed on the other side of the fixed flange of either the primary sheave or the secondary sheave, on the other outer side of the case in the direction of the primary shaft.

Further, in order to achieve the foregoing object, a fourth aspect of the present invention provides a V-belt CVT for a small vehicle, including: a primary sheave disposed on a primary shaft, to which torque is input from a power source, and forming a V-groove with a variable width for receiving a belt; a secondary sheave disposed on a secondary shaft, from which the torque is output to a driving wheel, and forming a V-groove with a variable width for receiving a belt; a V-belt received in the respective V-grooves of the primary sheave and the secondary sheave; an electric motor for driving a groove width adjustment mechanism for the V-groove of the primary sheave; and a case for housing the primary sheave and the secondary sheave, the primary sheave and the secondary sheave respectively having a pair of a movable flange and a fixed flange disposed oppositely for movement toward and away from each other and forming the V-groove, the groove width adjustment mechanism having a movable flange adjustment section for axially moving the movable flange of the primary sheave, and a speed reduction section for reducing and transmitting rotation of the electric motor to the movable flange adjustment section, and the movable flange adjustment section having a large diameter gear for rotation about the primary shaft, while the speed reduction section having a small diameter gear for transmitting the rotation of the electric motor directly or indirectly to the large diameter gear, in which: the power source is connected to one end of the primary shaft, and the fixed flange and the movable flange are respectively disposed on one end side and on the other end side of the primary shaft; and the movable flange adjustment section is disposed coaxially with, and on the other end side with respect to, the movable flange on the primary shaft, and the electric motor and the small diameter gear of the speed reduction section are disposed radially outwardly of the large diameter gear of the movable flange adjustment section.

Preferably, in the V-belt CVT for a small vehicle according to any one of the first to fourth aspects of the present invention described above, the electric motor is disposed outside the case such that an output shaft of the electric motor is perpendicular to the primary shaft.

Preferably, in the V-belt CVT for a small vehicle according to any one of the first to fourth aspects of the present invention described above, the case for housing the primary sheave and the secondary sheave is formed integrally with a case composing a part of the power source.

Preferably, in the V-belt CVT for a small vehicle according to any one of the first to fourth aspects of the present invention described above, the electric motor is covered by a case cover attached to an outer side of the case. Alternatively, a stepped part may be formed in a wall of the case, a case cover may be attached to an outer side of the stepped part, and the electric motor may be disposed in an internal space defined by the stepped part and the case cover.

In order to achieve the foregoing object, a first aspect of the present invention provides a straddle-type vehicle including the V-belt CVT for a small vehicle according to any one of the first to fourth aspects of the present invention described above.

In order to achieve the foregoing object, a second aspect of the present invention provides the straddle-type vehicle including the V-belt CVT for a small vehicle according to any one of the first to fourth aspects of the present invention described above, in which the electric motor is covered by a case cover attached to an outer side of the case.

Also, in order to achieve the foregoing object, a third aspect of the present invention provides the straddle-type vehicle including the V-belt CVT for a small vehicle according to any one of the first to fourth aspects of the present invention described above, in which a stepped part is formed in a wall of the case, a case cover is attached to an outer side of the stepped part, and the electric motor is disposed in an internal space defined by the stepped part and the case cover.

Preferably, in the straddle-type vehicle according to any one of the first to third aspects of the present invention described above, the case cover of the V-belt CVT is exposed to an outside of a vehicle body cover.

Effect of the Invention

In the V-belt CVT for a small vehicle and the straddle vehicle according to the present invention, the electric motor is disposed in the airflow path outside the case. This structure allows the electric motor to be kept away from a heat source such as the power source housed in the case, and to be actively cooled by the airflow.

Also, in the V-belt CVT for a small vehicle and the straddle vehicle according to the present invention, the power source is disposed adjacent to one outer side of the case in the direction of the primary shaft, and the electric motor is disposed adjacent to the fixed flange of either the primary sheave or the secondary sheave, on the other outer side of the case in the direction of the primary shaft. This structure allows the power source and the electric motor as heat sources to be located opposite to each other in the direction of the primary shaft, which can reduce the impact of heat on the electric motor. Since the electric motor is disposed adjacent to the fixed flange where the groove width adjustment mechanism is not present, it is easy to secure an installation space for the electric motor outside the case, allowing the electric motor to be installed compactly.

In addition, the movable flange adjustment section, which composes the groove width adjustment mechanism, may be provided coaxially with the primary shaft, and the electric motor and the small diameter gear of the speed reduction section, which also composes the groove width adjustment mechanism, may be disposed radially outwardly of the large diameter gear of the movable flange adjustment section. In such a case, the groove width adjustment mechanism can be downsized in the radial direction, and the projection of the groove width adjustment mechanism toward the other end in the direction of the primary shaft can be reduced.

Further, the electric motor may be disposed outside the case such that the output shaft of the electric motor is perpendicular to the primary shaft. In such a case, the electric motor can be disposed more compactly without projecting outward of the case, even if the external shape of the electric motor is vertically longer.

Moreover, the case for housing the primary sheave and the secondary sheave may be formed integrally with a case composing a part of the power source. In such a case, the number of parts of the power unit can be reduced, and accordingly the structure of the power unit can be simplified.

Still further, the electric motor may be covered by the case cover attached to the outer side of the case. In such a case, it is possible to improve both the protection and the maintainability of the electric motor by virtue of the case cover.

Furthermore, a stepped part may be formed in a wall of the case, a case cover may be attached to an outer side of the stepped part, and the electric motor may be disposed in an internal space defined by the stepped part and the case cover. In such a case, the electric motor can be installed more compactly. An airflow path may be formed inside the case cover to actively cool the electric motor.

Meanwhile, in the straddle-type vehicle for a small vehicle according to the present invention, the case cover of the V-belt CVT may be not covered by the vehicle body cover but exposed to the outside. In such a case, a sufficient amount of air can be sucked into and exhausted from the case cover, allowing the electric motor to be cooled actively. The case cover can be removed for easy maintenance of the electric motor.

DESCRIPTION OF REFERENCE NUMERALS AND SYMBOLS

3: crankcase
100: V-belt CVT
101: primary shaft
103: housing section
105: case
107: case cover
110: side opening (opening)
111: fixed flange
112: movable flange
113: primary sheave
121: fixed flange
122: movable flange
123: secondary sheave
131: V-belt
140: electric motor
141: groove width adjustment mechanism
143: bevel gear (speed reduction section)
144: ring gear (speed reduction section, small diameter gear)
145: movable flange adjustment section
162: reciprocating gear (large diameter gear)
200: automatic centrifugal clutch
300: speed reducer
400: axle
500: straddle-type vehicle (scooter-type motorcycle)
550: vehicle body cover
E: engine (power source)
P: power unit
Wf: front wheel
Wr: rear wheel (driving wheel)

BEST MODE FOR CARRYING OUT THE INVENTION

Figure 1:
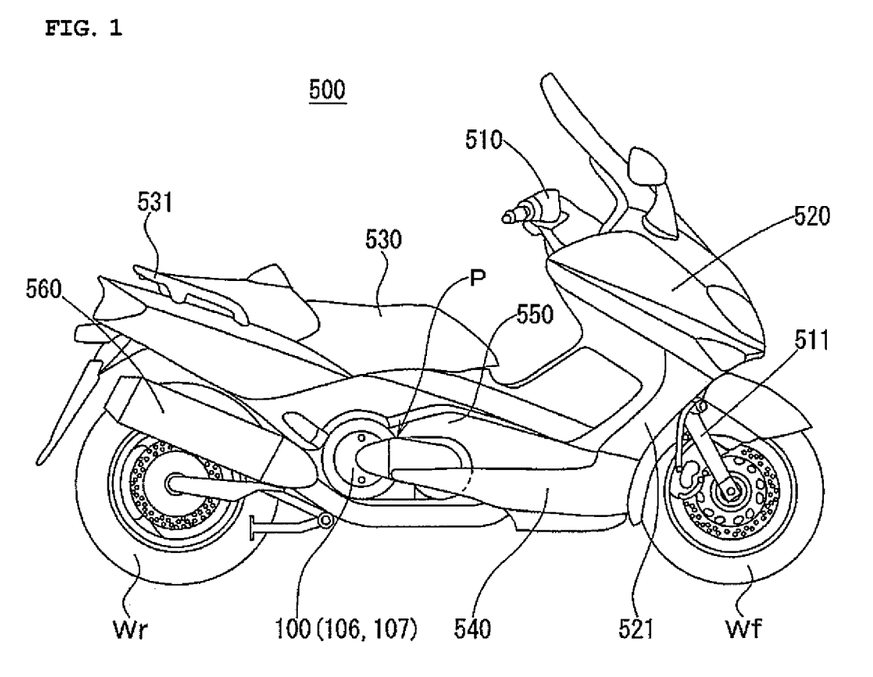
FIG. 1 is a side view of a straddle-type vehicle according to an embodiment of the present invention.

Description will hereinafter be made of a V-belt continuously variable transmission (CVT) for a small vehicle, and a straddle-type vehicle, according to an embodiment of the present invention with reference to the drawings. First of all, the overall structure of the straddle-type vehicle is described with reference to FIG. 1. FIG. 1 is a side view of a straddle-type vehicle according to an embodiment of the present invention.

As shown in the drawing, a straddle-type vehicle (scooter-type motorcycle) 500 has a head pipe (not shown) located at its upper front. A steering shaft (not shown) is inserted through the inside of the head pipe for rotational movement. Steering handlebars 510 are attached to the upper end of the steering shaft, and a front fork 511 is attached to the lower end thereof. A front wheel Wf is journaled for rotation at the lower end of the front fork 511.

The front part of the vehicle body is covered by a front cover 520 made of resin. The rear half of the front cover 520 serves as a leg shield 521 also made of resin. A tandem seat 530 is disposed rearward of the handlebars 510. A grab bar 531 is attached to the seat 530 so as to surround the rear part thereof.

A low footrest 540 is provided below and between the seat 530 and the handlebars 510. A power unit P is provided rearward of the footrest 540 and below the seat 530. As will be described later, the power unit P includes an engine E as a driving source, and a V-belt CVT 100 and a speed reducer 300, both built in a case (see FIG. 2). The most part of the power unit P is covered by a vehicle body cover 550 made of resin. In this embodiment, a case cover 107 and a decorative case 106 for the V-belt CVT 100 are not covered by the vehicle body cover 550 but exposed to the outside.

At the rear end of the power unit P is rotatably supported a rear wheel Wr, and is disposed a silencer 560 connected to an exhaust pipe (not shown) extending from the engine E. A storage box (not shown) with an openable top is provided inside a portion of the vehicle body cover 550 directly below the seat 530. The storage box extends over the entire length of the seat 530, and thus secures a high-capacity storage such as for a helmet (not shown).

Figure 2:
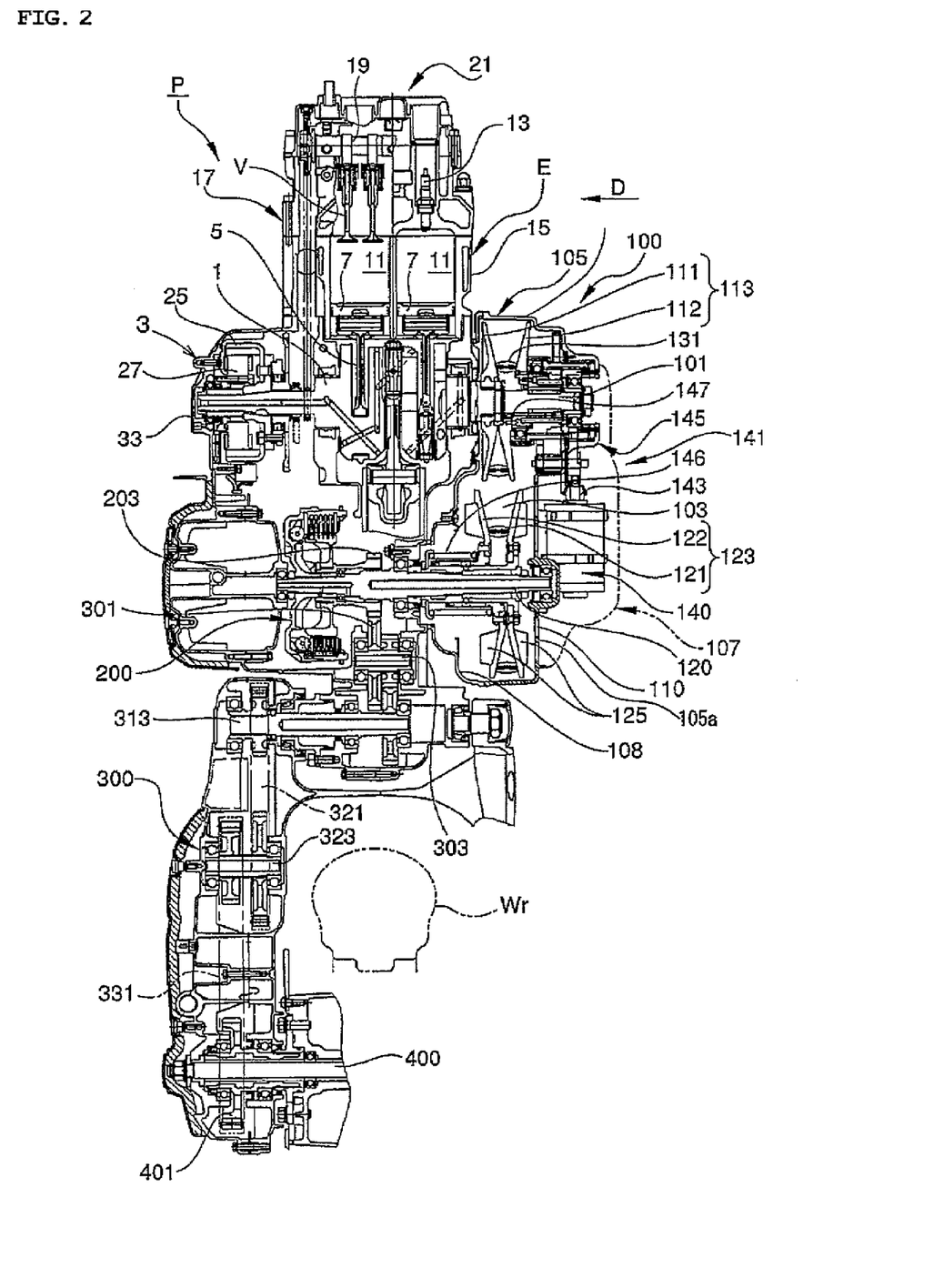
FIG. 2 is a horizontal sectional view of a power unit including a V-belt CVT for a small vehicle according to an embodiment of the present invention.
Figure 3:
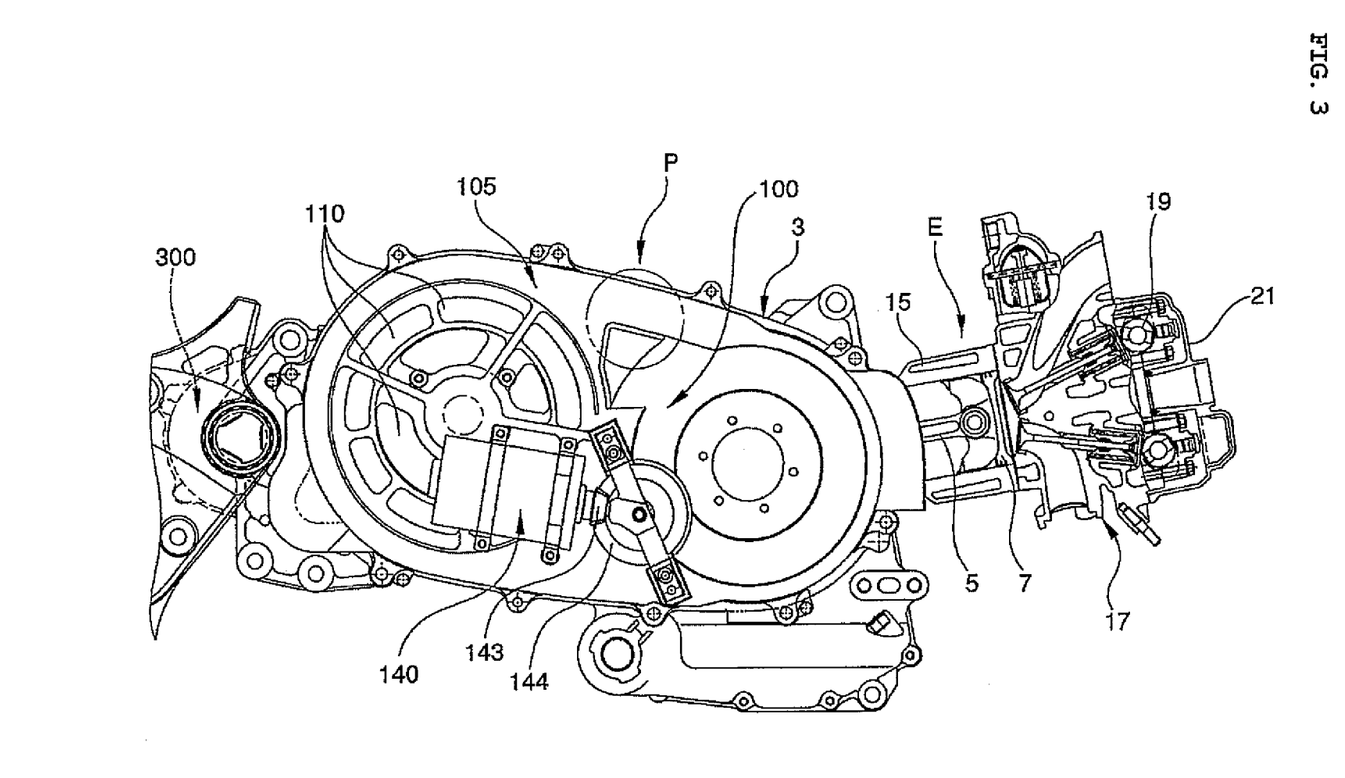
FIG. 3 is a front view of the power unit with a case cover for the V-belt CVT removed.
Figure 4:
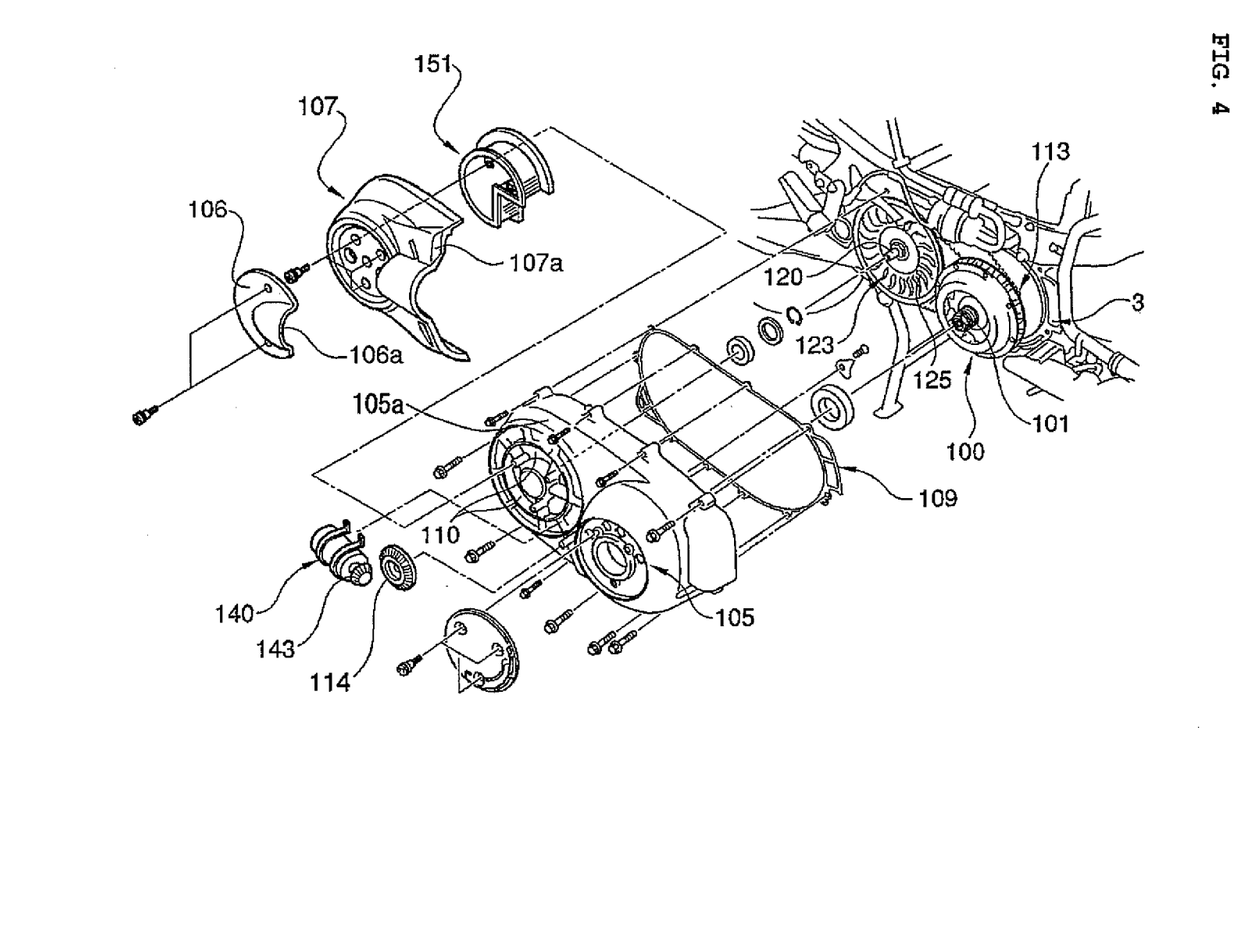
FIG. 4 is an exploded perspective view of an essential part of the power unit including the V-belt CVT.

Now, the power unit P will be described in detail with reference to FIGS. 2 to 4. FIG. 2 is a horizontal sectional view of a power unit including a V-belt CVT for a small vehicle according to an embodiment of the present invention. FIG. 3 is a front view of the power unit with the case cover for the V-belt CVT removed. FIG. 4 is an exploded perspective view of an essential part of the power unit including the V-belt CVT.

The power unit P shown in FIGS. 2 and 3 is mountable on a small vehicle such as the scooter-type motorcycle shown in FIG. 1, for example. The power unit P transmits the torque of the engine E as a power source, via the V-belt CVT (which may herein after be referred to simply as "CVT") 100 according to this embodiment, an automatic centrifugal clutch 200 and the speed reducer 300 which utilizes a gear train, to an axle 400 for the rear wheel Wr as a driving wheel.

The engine E includes, as its main constituents, a crankcase 3, plural pistons 7, 7, . . . , a cylinder block 15, a cylinder head 17 and a head cover 21. A crankshaft 1 is rotatably supported by the crankcase 3. The pistons 7 are coupled to the crankshaft 1 via respective connecting rods 5. The cylinder block 15 is joined to the upper part of the crankcase 3, and has plural cylinders (combustion chambers) 11, 11, . . . within which the respective pistons 7 slide. The cylinder head 17 is joined to the upper part of the cylinder block 15, and provided with spark plugs 13 and valves V for sucking and exhausting air to and from the respective cylinders 11. The head cover 21 includes a head cover 21 for covering a camshaft 19 assembled on top of the cylinder head 17.

In the engine E of this embodiment, the axis of the crankshaft 1 extends in the vehicle width direction, and one end of the crankshaft 1 (the left end in FIG. 2; the same applies hereinafter) is provided with a flywheel 25. A generator 27 is attached to the inside of the flywheel 25. The generator 27 generates electricity as the crankshaft 1 rotates, and supplies the electricity to on-vehicle electrical components and charges an on-vehicle battery.

On the other hand, a primary shaft 101 of the CVT 100 extends continuously from the other end of the crankshaft 1 (the right end in FIG. 2; the same applies hereinafter). The torque of the engine E is input to the primary shaft 101. A left case cover 33 for covering the flywheel 25 and the generator 27 from outside is attached to one side of the crankcase 3 in the axial direction of the crankshaft 1 or the primary shaft 101 (the left side in FIG. 2; the same applies hereinafter). A case 105 for defining a housing section 103 of the CVT 100, which will be described later, is disposed on the other side of the crankcase 3 in the axial direction of the crankshaft 1 or the primary shaft 101 (the right side in FIG. 2; the same applies hereinafter). Side openings 110 are formed in the surface of the case 105 on the other side in the axial direction of the primary shaft 101. The outer side of the case 105 including the side openings (openings) 110 is covered by the case cover 107 (indicated by the dot-dashed line in FIG. 2; see FIG. 4).

The housing section 103 of the CVT 100 is separated from the crankcase 3 by an inner cover 108 attached to a side of the crankcase 3, so that droplets of lubricant oil in the crankcase 3 will not enter the housing section 103. A packing 109 shown in FIG. 4 is interposed between the joining faces of the crankcase 3 and the case 105 for defining the housing section 103. The packing 109 prevents foreign matter from entering the housing section 103 through the space between the joining faces.

As shown in FIGS. 2 and 4, the CVT 100 of this embodiment includes a primary sheave 113, a secondary sheave 123, a V-belt 131, a groove width adjustment mechanism 141, the case 105 and the case cover 107. The primary sheave 113 is disposed on the primary shaft 101, and includes a fixed flange 111 and a movable flange 112 that form therebetween a V-groove for receiving a belt. The secondary sheave 123 is disposed on a secondary shaft 120, which is arranged parallel to the primary shaft 101 and from which an output for the rear wheel Wr is taken. The secondary sheave 123 includes a fixed flange 121 and a movable flange 122 that form therebetween a V-groove for receiving a belt. The V-belt 131 is wound around through the V-grooves of the primary sheave 113 and the secondary sheave 123, and transmits the rotational force between both the sheaves 113 and 123. The groove width adjustment mechanism 141 applies an arbitrary amount of locomotive force to the movable flange 112 of the primary sheave 113 through the electric motor 140 to adjust the groove widths of the primary sheave 113 and the secondary sheave 123. The details of the groove width adjustment mechanism 141 will be described later. The case 105 allows the primary sheave 113 and the secondary sheave 123 to be housed and held in the housing section 103, as described above. The case cover 107 covers the vicinity of the side openings 110 of the case 105.

In the primary sheave 113, the fixed flange 111 is located on one side in the axial direction of the primary shaft 101 (the left side in FIG. 2; the same applies hereinafter), while the movable flange 112 is located on the other side in the axial direction of the primary shaft 101 (the right side in FIG. 2; the same applies hereinafter). The movable flange 112 is attached to the primary shaft 101 oppositely to the fixed flange 111 so as to be movable in the axial direction of the primary shaft 101, so that a V-groove of a variable width can be formed between the movable flange 112 and the fixed flange 111. The movable flange 112 is mounted on the primary shaft 101 via a spline or a key so as not to be rotatable relative to the primary shaft 101. The attachment structure of the movable flange 112 will be described in detail later with reference to FIGS. 5 and 6, as a part of the description of the groove width adjustment mechanism 141.

In the secondary sheave 123, the fixed flange 121 is located on the other side in the axial direction of the secondary shaft 120, and the movable flange 122 is located on one side in the axial direction of the secondary shaft 120, in contrast to the primary sheave 113. The movable flange 122 is attached to the secondary shaft 120 oppositely to the fixed flange 121 so as to be movable in the axial direction of the secondary shaft 120, so that a V-groove of a variable width can be formed between the movable flange 122 and the fixed flange 121, similarly to the primary sheave 113. The movable flange 122 is mounted on the secondary shaft 120 via a spline or a key so as not to be rotatable relative to the secondary shaft 120. The secondary sheave 123 is further provided with a sheave urging spring 146 for urging the movable flange 122 toward the fixed flange 121.

For convenience of illustration of the operation of the primary sheave 113 and the secondary sheave 123, halves of the primary sheave 113 and the secondary sheave 123 in FIG. 2 (the halves above the rotational axes of the movable flanges 112 and 122) show a state where the widths of the V-grooves are large, while the other halves show a state where the widths of the V-grooves are small. In practice, the movable flanges 112 and 122 are both integral disk-shaped members, and are adapted to move in their entirety on the respective shafts in the same direction (the same applies to FIGS. 5 and 6, which will be described later).

Figure 5:
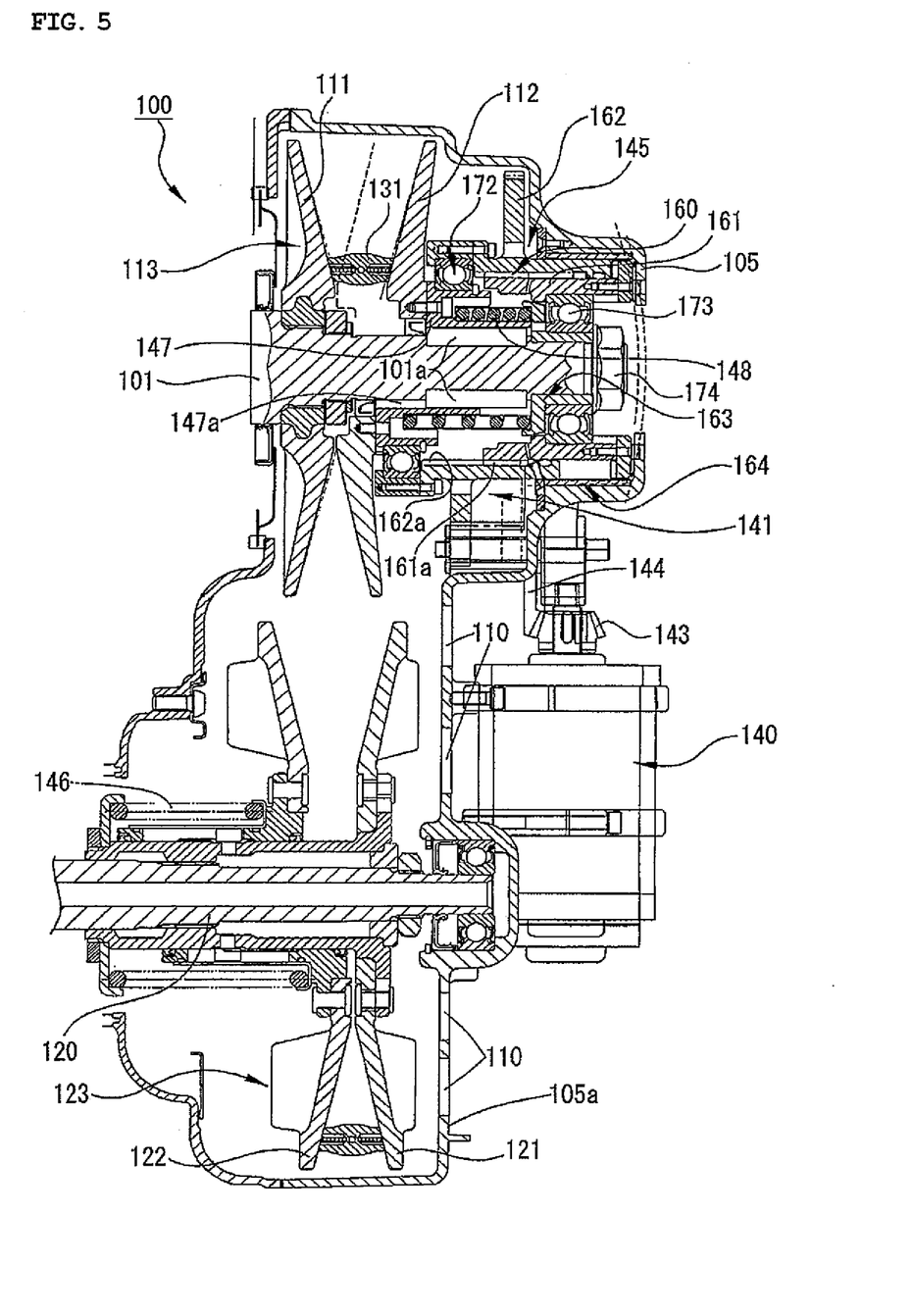
FIG. 5 is an enlarged sectional view of a part of FIG. 2, showing the V-belt CVT.
Figure 6:
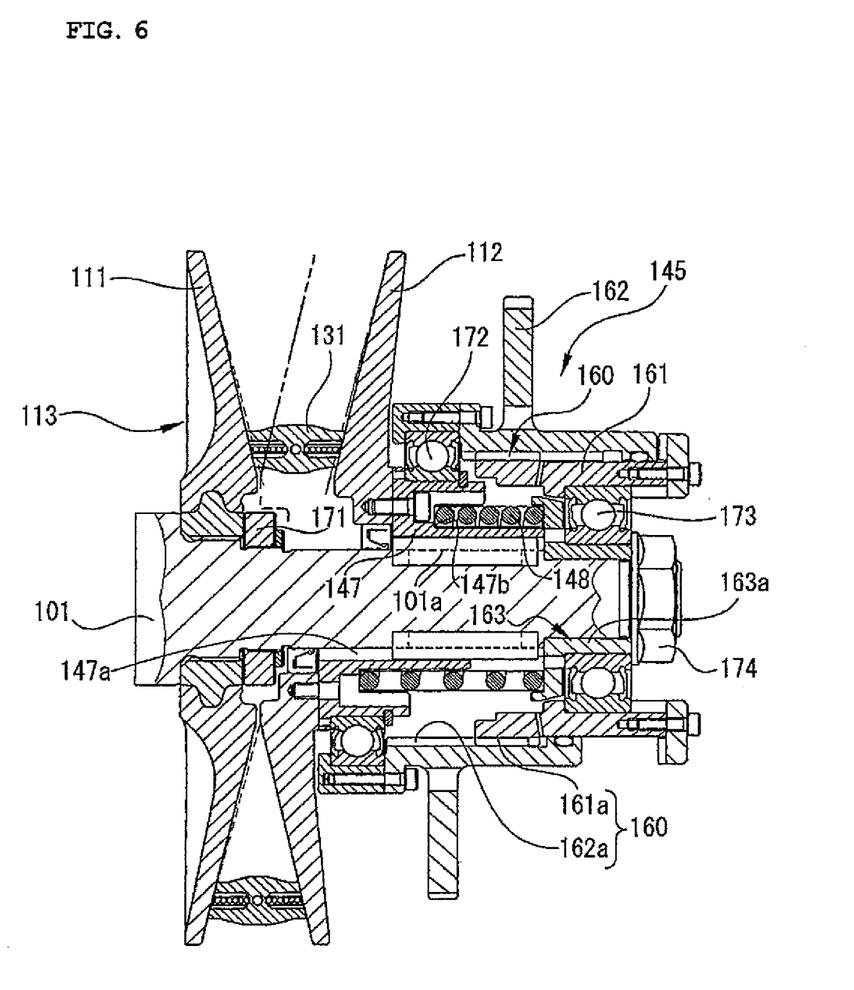
FIG. 6 is an enlarged sectional view of a part of FIG. 5, showing the V-belt CVT.

Now, the structure of the groove width adjustment mechanism 141 of this embodiment will be described more specifically with reference to FIGS. 5 and 6. FIG. 5 is an enlarged sectional view of a part of FIG. 2, showing the V-belt CVT. FIG. 6 is an enlarged sectional view of a part of FIG. 5, showing the V-belt CVT.

As shown in FIG. 5, the groove width adjustment mechanism 141 includes an electric motor 140 as a driving source, a bevel gear 143 and a ring gear (small diameter gear) 144 as a speed reduction section for reducing and then transmitting the rotation of the electric motor 140, and a movable flange adjustment section 145 for receiving the rotational force via the ring gear 144 to axially displace the movable flange 112 of the primary sheave 113.

The movable flange adjustment section 145 converts the rotation of the electric motor 140 into force in the direction of the primary shaft 101 through a feed screw mechanism 160 disposed coaxially with the primary shaft 101, and applies the converted force as locomotive force to the movable flange 112 of the primary sheave 113. The primary sheave 113 is also provided with a sheave urging spring 148 for urging the movable flange 112 toward the fixed flange 111. The sheave urging spring 148 is disposed at the back of the movable flange 112 of the primary sheave 113, and urges the movable flange 112 in the direction of narrowing the groove width of the primary sheave 113. The feed screw mechanism 160 of the movable flange adjustment section 145 is located radially outwardly of, and in overlapping relationship in the axial direction of the primary shaft 101 with, the sheave urging spring 148.

To describe the structure further specifically with reference to FIG. 6, the fixed flange 111 of the primary sheave 113 is spline-fitted on the primary shaft 101 and then fastened with a nut 171, so as not to be axially movable relative to, but to be rotatable together with, the primary shaft 101. On the other hand, the movable flange 112 of the primary sheave 113 is mounted on the primary shaft 101 via a cylindrical sleeve 147, which is screwed to the inner circumference at the back of the movable flange 112. The movable flange 112 is thereby axially slidable relative to, and rotatable together with, the primary shaft 101. That is, a slide key 101a formed on the outer circumferential surface of the primary shaft 101 is inserted into a key groove 147a formed in the inner circumferential surface of the sleeve 147, so that the sleeve 147 is axially slidable relative to, and rotatable together with, the primary shaft 101.

A reciprocating gear (large diameter gear) 162 is attached via a bearing 172 to the outer circumference of the sleeve 147 on the side where the movable flange 112 is fixed. The reciprocating gear 162 and the movable flange 112 are rotatable relative to, and axially movable together with, each other. The rotation of the electric motor 140 is transmitted to the reciprocating gear 162 via the bevel gear 143 and the ring gear 144 as a speed reduction section (see FIG. 5).

A cylindrical feed guide 161 is axially fixed to the primary shaft 101 via a sleeve 163a of a spring receiving member 163 mounted to an end of the primary shaft 101 through a bearing 172 for rotatably supporting the primary shaft 101. An end of the feed guide 161 is secured to the case 105 (see FIG. 5) for housing and holding the primary sheave 113 and the secondary sheave 123, so that the feed guide 161 is prevented from rotating in the rotating direction of the primary shaft 101.

The feed guide 161 is disposed coaxially with the primary shaft 101. The feed screw mechanism 160 is composed of a male thread 161a formed on the outer circumferential surface of the feed guide 161, and the reciprocating gear 162 formed in its inner circumferential surface with a female thread 162a for threading engagement with the male thread 161a. The feed screw mechanism 160 moves the reciprocating gear 162 forward and backward (by means of the treads) along the axis of the primary shaft 101, according to the amount of rotation of the electric motor 140 received by the reciprocating gear 162 via the bevel gear 143 and the ring gear 144 (see FIG. 5) as the speed reduction section.

As shown in FIG. 5, a cylindrical guide member 164, which serves as a slide guide mechanism for guiding the axial movement of the reciprocating gear 162 in the feed screw mechanism 160 of the movable flange adjustment section 145, is pressed into and fixed in the case 105 of this embodiment. The cylindrical guide member 164 is in sliding contact with, and thereby supports, the outer circumference of the cylindrical part of the reciprocating gear 162 for sliding movement, so as to serve as a fall prevention mechanism when the movable flange 112 moves axially. The cylindrical guide member 164 is integrally fixed to the high-rigidity case 105. With this structure, the torque of the electric motor 140 can be efficiently converted into axial locomotive force, and a fall prevention mechanism with a fall prevention function for the movable flange 112 can be made with a minimum number of constituent parts required. Consequently, the CVT 100 can be made lightweight and compact.

In addition, a part of the cylindrical guide member 164 is located on the other side in the axial direction (the right side in FIG. 5, that is, on the outer side of the vehicle) with respect to the end of the primary shaft 101. As described above, the cylindrical guide member 164 is integrally fixed to the inner wall of the most projected part of the case 105, which is the widest part of the CVT 100 in the vehicle width direction, so that the guide part can be extended as far as to the outer side of the vehicle with respect to the end of the primary shaft 101. Consequently, a sufficient fall prevention function for the movable flange 112 can be secured without increasing the width of the case 105 or the length of the primary shaft 101.

The axial movement of the reciprocating gear 162 and the bearing 172 moves the movable flange 112 formed integrally with the sleeve 147, which in turn varies the groove width of the primary sheave 113. Consequently, the movable flange 112 can be displaced in the axial direction of the primary shaft 101 according to the amount of rotation of the reciprocating gear 162, so that the groove width of the primary sheave 113 can be adjusted arbitrarily. The male thread 161a and the female thread 162a use trapezoidal threads.

The sheave urging spring 148 is interposed between the spring receiving member 163 mounted on the distal end of the primary shaft 101, and a seat surface 147b of the sleeve 147. The sheave urging spring 148 is disposed coaxially with the primary sheave 101, and urges the movable flange 112 in the direction of narrowing the groove width of the primary sheave 113. The sheave urging spring 148 is located on the radially inner side of, and in overlapping relationship in the axial direction of the primary shaft 101 with, the feed spring mechanism 160 composed of the feed guide 161 and the reciprocating gear 162.

The bearing 172 is interposed between the movable flange 112 of the primary sheave 113 and the feed screw mechanism 160 of the movable flange adjustment section 145. The bearing 172 is located radially outwardly of, and in overlapping relationship in the axial direction of the primary shaft 101 with, the sheave urging spring 148. The bearing 172 is arranged side by side with the feed screw mechanism 160.

The reaction force of the locomotive force generated by the feed spring mechanism 160 and applied to the movable flange 112 is transmitted via the feed guide 161 and then the bearing 172, and received by a fixing nut 174 threaded on the end of the primary shaft 101. The reaction force of the assistive locomotive force generated by the sheave urging spring 148 is transmitted via the spring receiving member 163, and also received by the fixing nut 174. With this structure, the locomotive force applied to the movable flange 112 and the reaction force are all balanced within the primary shaft 101, and the case 105 and the engine E (see FIGS. 2 and 3) are not subjected to any unnecessary stress. That is, since the motive force of the movable flange adjustment section 145 is balanced within primary shaft 101, the case 105 and the crankcase 3 (see FIGS. 2 and 3) do not require reinforcement, such as a bearing for receiving the motive force of the movable flange adjustment section 145.

Now, description will be made of the operation of varying the speed change ratio of the CVT 100 by the groove width adjustment mechanism 141 described above. The rotation of the electric motor 140 is transmitted via the bevel bear 143 and the ring gear 144 as a speed reduction section to the reciprocating gear 162 of the feed screw mechanism 160. Then, the reciprocating gear 162 moves axially forward and backward on the primary shaft 101 along the feed guide 161 according to the amount of rotation of the electric motor 140. This causes the sleeve 147, which is coupled to the reciprocating gear 162, to move axially forward and backward on the primary shaft 101 while expanding and contracting the sheave urging spring 148. Consequently, the movable flange 112 coupled to the sleeve 147 is displaced so as to make the groove width of the primary sheave 113 wider or narrower.

For example, when the electric motor 140 is driven forward, the movable flange 112 is displaced in the direction of the arrow D of FIG. 2 so as to make the groove width of the primary sheave 113 narrower. When the electric motor 140 is driven backward, the movable flange 112 is displaced in the opposite direction of the arrow D of FIG. 2 so as to make the groove width of the primary sheave 113 wider.

When the electric motor 140 is driven forward and the groove width of the primary sheave 113 becomes narrower, the winding diameter of the V-belt 131 around the primary sheave 113 becomes larger This creates tension in the V-belt 131 that pulls it toward the movable flange 112. The tension is received by the movable flange 122 of the secondary sheave 123, and displaces it away from the fixed flange 121 against the urging force of the sheave urging spring 146. As a result, the groove width of the secondary sheave 123 becomes larger, and accordingly the winding diameter of the V-belt 131 around the secondary sheave 123 becomes smaller. When the groove width of the primary sheave 113 becomes smaller and accordingly the groove width of the secondary sheave 123 becomes larger as described above, the speed reduction ratio of the CVT 100 becomes larger.

On the other hand, when the electric motor 140 is driven backward and the groove width of the primary sheave 113 becomes larger, the winding diameter of the V-belt 131 around the primary sheave 113 becomes smaller. This reduces the tension applied to the movable flange 122 of the secondary sheave 123, which allows the movable flange 122 to be pushed back toward the fixed flange 121 by the urging force of the sheave urging spring 146. Consequently, the groove width of the secondary sheave 123 becomes smaller, and the winding diameter of the V-belt 131 around it becomes larger. When the groove width of the primary sheave 113 becomes larger and accordingly the groove width of the secondary sheave 123 becomes smaller as described above, the speed reduction ratio of the CVT 100 becomes smaller.

The operation of the electric motor 140 of the movable flange adjustment section 145 is controlled by a control unit (not shown). The control unit detects the operating state and running condition of the vehicle based on the values indicating the rotational speed of the crankshaft 1 (the input speed to the CVT 100), the rotational speed of the secondary shaft 120 (the output speed from the transmission), the accelerator opening, the running speed, etc., detected by sensors. The control unit then controls the rotation of the electric motor 140 according to the detected operating state and running condition so as to achieve optimum speed change ratios. That is, the speed change ratio can be arbitrarily changed according to the operating state and running condition of the straddle-type vehicle 500 (see FIG. 1), by varying the groove width of the primary sheave 113 by controlling the rotation of the electric motor 140 according to the operating state and running condition of the vehicle.

In this embodiment, as shown in FIGS. 2 and 5, the fixed flange 121 and the movable flange 122 of the secondary sheave 123 are formed integrally with an agitating vane 125 for sucking and exhausting air. The side openings 110 for sucking air are formed in the surface of the case 105 on the other side in the direction of the secondary shaft 120 (the right side in FIGS. 2 and 5), oppositely to the fixed flange 121. The electric motor 140 is disposed on the case 105, facing the side openings 110. That is, the electric motor 140 is located in the airflow path outside the case 105.

Also in this embodiment, a part of the case 105 on the secondary sheave 123 side, on the other side, is formed with a stepped part 105a that is lower than a part of the case 105 on the primary sheave 113 side. The side openings 110 are formed in the stepped part 105a, and the electric motor 140 is located on the stepped part 105a. Further in this embodiment, the case cover 107 is attached to the outer side of the stepped part 105a of the case 105, as shown in FIG. 4. The case cover 107 covers the outer side of the electric motor 140 disposed on the case 105, and defines an internal space through which the outside air is sucked into the housing section 103 for cooling purposes (see FIG. 2). The internal space defined by the case cover 107 accommodates an air cleaner 151 for removing foreign matter from the sucked outside air.

In addition, the case cover 107 is formed with an opening 107a through which the air is sucked toward the secondary sheave 123, and the decorative cover 106 attached to the outer side of the case cover 107 is formed with a recess 106a. The opening 107a and the recess 106a together form a suction port for sucking the outside air into the housing section 103 for cooling purposes.

As shown in FIG. 2, the automatic centrifugal clutch 200 is mounted on the secondary shaft 120 on one side in the axial direction thereof. When the rotational speed of the secondary shaft 120 becomes a predetermined value or more, the automatic centrifugal clutch 200 presses its plural clutch plates into contact with each other to rotate an output gear 203 so as to transmit power to the speed reducer 300.

The speed reducer 300 includes, as its main constituents, a first speed reduction shaft 303 mounted with a first speed reduction gear 301, second and third speed reduction shafts 313 and 323, and chains 321 and 331. The first speed reduction gear 301 meshes with the output gear 203 to transmit power to the first speed reduction shaft 303. The power transmitted to the first speed reduction shaft 303 is transmitted via a gear train to the second speed reduction shaft 313, from which the power is transmitted via the chain 321 to the third speed reduction shaft 323. The power transmitted to the third speed reduction shaft 323 is transmitted via the chain 331 to a vehicle gear 401 on the axle 400. The speed reducer 300 thus constructed reduces the rotation of the output gear 203 at a predetermined ratio, and transmits the reduced rotation to the axle 400.

As described above, in the V-belt CVT 100 for a small vehicle and the straddle vehicle 500 according to this embodiment, the electric motor 140 is disposed in the airflow path outside the case 105. This structure allows the electric motor 140 to be kept away from heat generated by the engine E housed in the case 105, and to be actively cooled by the airflow.

Also in the V-belt CVT 100 for a small vehicle and the straddle vehicle 500 according to this embodiment, the engine E is located adjacent to one side of the case 105 in the direction of the primary shaft 101, outside the case 105. At the same time, the electric motor 140 is located on the other side of the fixed flange 121 of the secondary sheave 123, on the other side of the case 105 in the direction of the primary shaft 101, outside the case 105. This structure allows the engine E and the electric motor 140 as heat sources to be located opposite to each other in the direction of the primary shaft 101, which can prevent heat from directly radiating toward the electric motor 140. As a result, the influence of heat from the power unit P is reduced, and the temperature of the electric motor 140 increases to a smaller degree. Since the electric motor 140 is located on the other side of the fixed flange 121 where the groove width adjustment mechanism 141 is not present, it is easy to secure an installation space for the electric motor 140 outside the case 105, allowing the electric motor 140 to be installed compactly.

In addition, the movable flange adjustment section 145, which composes the groove width adjustment mechanism 141, is provided coaxially with the primary shaft 101, and the electric motor 140 and the ring gear 144 of the speed reduction section, which also composes the groove width adjustment mechanism 141, are located radially outwardly of the reciprocating gear 162 of the movable flange adjustment section 145. Thus, the groove width adjustment mechanism 141 can be downsized in the radial direction, and the projection of the groove width adjustment mechanism 141 toward the other end in the direction of the primary shaft 101 can be reduced.

Further, in the case where the electric motor 140 is covered by the case cover 107 attached to the outer side of the case 105, the electric motor 140 can be exposed easily by just removing the case cover 107. Thus, it is possible to improve both the protection and the maintainability of the electric motor 140. Moreover, the electric motor 140 can be disposed in an internal space defined by the stepped part 105a formed in the wall of the case 105 and the case cover 107 attached to the outer side of the stepped part 105a. Thus, the electric motor 140 can be disposed more compactly.

The airflow path formed inside the case cover 107 can actively cool the electric motor 140. That is, the opening 107a formed in the case cover 107 for sucking air allows air to flow through the vicinity of the electric motor 140 before the air is sucked into the housing section 103 of the case 105. Thus, the electric motor 140 itself, which generates heat, can be cooled effectively. This structure can relax the heat resistance requirement for the electric motor 140 of the groove width adjustment mechanism 141, contributing to cost reduction. Since the electric motor 140 is covered by the case cover 107, the waterproof requirement for the electric motor 140 can be relaxed, contributing to cost reduction.

Further, the electric motor 140 is disposed outside the case 105 such that the output shaft of the electric motor 140 is perpendicular to the primary shaft 113. Thus, the electric motor 140 can be disposed compactly without projecting outward of the case 105, even if the external shape of the electric motor 140 is vertically longer. Consequently, the increase in the width of the power unit P can be kept to a minimum, thereby keeping to a minimum the projection of the power unit P toward the side of the vehicle body.

Meanwhile, in the straddle-type vehicle 500 for a small vehicle according to this embodiment, the case cover 107 of the V-belt CVT 100 is not covered by the vehicle body cover 550 but exposed to the outside. Thus, a sufficient amount of air can be sucked into and exhausted from the case cover 107, allowing the electric motor 140 to be cooled actively. The case cover 107 can be removed for easy maintenance of the electric motor 140.

The V-belt CVT for a small vehicle and the straddle-type vehicle according to the present invention are not limited to the embodiment described above. For example, components of the V-belt CVT for a small vehicle according to the present invention, such as the primary shaft, the secondary shaft, the primary sheave, the secondary sheave, the V-belt, the groove width adjustment mechanism, the case, the case cover, the electric motor and the openings for sucking and exhausting air, are not limited to those in the embodiment described above, but may take various forms based on the gist of the present invention.

For example, the electric motor 140 is disposed adjacent to the secondary sheave 123 outside the case 105 and covered by the case cover 107 in the embodiment described above. However, the electric motor 140 may be disposed adjacent to the primary sheave 113 outside the case 105 and covered by the case cover 107.

Also, the case 105 for housing the primary sheave 113 and the secondary sheave 123 is provided separately from the crankcase 3 composing apart of the engine E. However, the case 105 may be formed integrally with the crankcase 3, in which case the number of parts of the power unit P can be reduced, and accordingly the structure of the power unit P can be simplified.

The V-belt CVT for a small vehicle according to the present invention may be applied not only to the scooter-type motorcycle as described above but also to various straddle-type vehicles, such as two-wheeled or three-wheeled bicycles with an electric motor (motorbikes), motorcycles other than the scooter type, four-wheeled buggies (all terrain vehicles) and snowmobiles.

Also, the V-belt CVT 100 for a small vehicle according to the present invention is applied to the power unit P with the engine E as a driving source in the embodiment described above. However, the V-belt CVT 100 for a small vehicle according to the present invention may be applied to a power unit P with an electric motor as a driving source.

Further, the electric motor 140 is disposed and cooled in the vicinity of the side openings 110 which form an air suction path into the case 105, in the embodiment described above. However, the electric motor 140 may be disposed and cooled in an air exhaust path for exhausting air to the outside of the case 105 such as a duct or a pipe, for example.

The invention claimed is:
1. A V-belt continuously variable transmission comprising:
a primary sheave disposed on a primary shaft, to which torque is input from a power source, and including a V-groove with a variable width;
a secondary sheave disposed on a secondary shaft, from which the torque is output to a driving wheel, and including a V-groove with a variable width;
a V-belt received in the respective V-grooves of the primary sheave and the secondary sheave;
an electric motor arranged to drive a groove width adjustment mechanism for the V-groove of the primary sheave; and a case arranged to house the primary sheave and the secondary sheave;
wherein
the case includes an opening arranged to at least suck air into the case, and the electric motor is disposed in a flow path of the air outside the case;
the V-belt is wound around the primary sheave and the secondary sheave to define a ring;
the electric motor at least partially overlaps an inside area of the ring in a lateral side view of a vehicle including the V-belt continuously variable transmission;
a case cover arranged to cover the electric motor and attached to an outer side of the case;
the electric motor is disposed in a space defined between the case and the case cover;
the case cover includes an opening through which the air is introduced into the space; and
the air in the space is introduced into the case through the opening of the case cover.

2. A V-belt continuously variable transmission comprising:
a primary sheave disposed on a primary shaft, to which torque is input from a power source, and including a V-groove with a variable width;
a secondary sheave disposed on a secondary shaft, from which the torque is output to a driving wheel, and including a V-groove with a variable width;
a V-belt received in the respective V-grooves of the primary sheave and the secondary sheave;
an electric motor arranged to drive a groove width adjustment mechanism for the V-groove of the primary sheave; and
a case arranged to house the primary sheave and the secondary sheave;
wherein
the primary sheave and the secondary sheave respectively include a movable flange and a fixed flange disposed to move toward and away from each other and to define the V-groove;
the power source is disposed adjacent to a first outer side of the case in a direction in which the primary shaft extends, and the electric motor overlaps with the fixed flange of the secondary sheave in an axial direction of the secondary shaft, on a second outer side of the case in the direction in which the primary shaft extends; and
the first outer side of the case and the second outer side of the case are opposed to each other with the primary shaft interposed therebetween.

3. The V-belt continuously variable transmission according to claim 1, wherein
the primary sheave and the secondary sheave respectively include a movable flange and a fixed flange disposed to move toward and away from each other and to define the V-groove, and
the power source is disposed adjacent to the outer side of the case in a direction in which the primary shaft extends, and the electric motor is disposed adjacent to the fixed flange of either the primary sheave or the secondary sheave, on another outer side of the case in the direction in which the primary shaft extends.

4. The V-belt continuously variable transmission according to claim 2, wherein:
the fixed flange of the primary sheave is disposed on a first inner side of the case in the direction in which the primary shaft extends, and the movable flange of the primary sheave is disposed on a second inner side of the case in the direction in which the primary sheave extends;
the movable flange of the secondary sheave is disposed on the first inner side of the case in a direction in which the secondary shaft extends, and the fixed flange of the secondary sheave is disposed on the second inner side of the case in the direction in which the secondary sheave extends; and
the power source is disposed adjacent to the first outer side of the case in the direction in which the primary shaft extends, and at least a portion of the electric motor is disposed adjacent to the fixed flange of the secondary sheave, on the second outer side of the case in the direction in which the primary shaft extends.

5. The V-belt continuously variable transmission according to claim 1, wherein the electric motor is disposed outside the case such that an output shaft of the electric motor is perpendicular to the primary shaft.

6. The V-belt continuously variable transmission according to claim 1, wherein the case arranged to house the primary sheave and the secondary sheave is integrally provided with a case defining a portion of the power source.

7. The V-belt continuously variable transmission according to claim 1, wherein a stepped portion is provided in a wall of the case, the case cover is attached to an outer side of the stepped portion, and the electric motor is disposed in an internal space defined by the stepped portion and the case cover.

8. A straddle-type vehicle comprising the V-belt continuously variable transmission according to claim 1.

9. A straddle-type vehicle comprising the V-belt continuously variable transmission according to claim 7.

10. A straddle-type vehicle comprising the V-belt continuously variable transmission according to claim 1, wherein the case cover of the V-belt continuously variable transmission is exposed to an outside of a vehicle body cover.

11. The straddle-type vehicle according to claim 9, wherein the case cover of the V-belt continuously variable transmission is exposed to an outside of a vehicle body cover.

* * * * *